United States Patent
Oohashi et al.

(10) Patent No.: US 9,487,252 B2
(45) Date of Patent: Nov. 8, 2016

(54) VEHICULAR UNDERCOVER AND METHOD OF MANUFACTURING THE SAME

(71) Applicant: TOYOTA BOSHOKU KABUSHIKI KAISHA, Aichi-ken (JP)

(72) Inventors: Satoshi Oohashi, Nagakute (JP); Makoto Kawamoto, Seto (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/683,378

(22) Filed: Apr. 10, 2015

(65) Prior Publication Data

US 2015/0329153 A1    Nov. 19, 2015

(30) Foreign Application Priority Data

May 15, 2014 (JP) ................................. 2014-101101

(51) Int. Cl.
| | |
|---|---|
| *B62D 35/02* | (2006.01) |
| *B62D 29/04* | (2006.01) |
| *B29C 51/10* | (2006.01) |
| *B60R 13/08* | (2006.01) |
| *B29C 59/00* | (2006.01) |
| *B29L 31/30* | (2006.01) |
| *B29K 105/00* | (2006.01) |
| *B62D 35/00* | (2006.01) |

(52) U.S. Cl.
CPC .............. *B62D 35/02* (2013.01); *B29C 51/10* (2013.01); *B29C 59/007* (2013.01); *B60R 13/0861* (2013.01); *B62D 29/043* (2013.01); *B29K 2023/06* (2013.01); *B29K 2105/256* (2013.01); *B29L 2031/3005* (2013.01); *B62D 35/005* (2013.01)

(58) Field of Classification Search
CPC .......................... B60R 13/0861; B62D 35/02
USPC ............ 296/38, 180.1, 180.2, 181.5, 193.02; 180/69.1
See application file for complete search history.

(56) References Cited

U.S. PATENT DOCUMENTS

| 8,579,361 B2 | 11/2013 | Takeuchi |
| 2011/0163570 A1 | 7/2011 | Takeuchi |

FOREIGN PATENT DOCUMENTS

| DE | WO 2007036440 A1 * | 4/2007 | ......... B60R 13/0861 |
| JP | 2002-018927 | 1/2002 | |
| WO | 2010/050060 | 5/2010 | |

OTHER PUBLICATIONS

English translation of WO 2007/036440; retreived May 23, 2016 via PatentTranslate located at www.epo.org.*
Japanese Office Action for JP App. No. 2014-101101 dated on Mar. 17, 2016, along with English-language translation thereof.

* cited by examiner

Primary Examiner — Jason S Daniels
(74) Attorney, Agent, or Firm — Greenblum & Bernstein, P.L.C.

(57) ABSTRACT

A vehicular undercover constituting a lower surface of a vehicle and molded from a synthetic resin sheet includes a cover main body having a plate shape including one surface that is a flat surface and another surface that is opposite to the one surface, a reinforcing rib projecting from the other surface of the cover main body, and at least two auxiliary ribs projecting form the other surface of the cover main body and sandwiching the reinforcing rib therebetween. The cover main body includes a first portion and a second portion. The first portion is between the at least two auxiliary ribs and has a first thickness, and the second portion is on an opposite side to the first portion with respect to each of the at least two auxiliary ribs and has a second thickness. The first thickness is smaller than the second thickness.

10 Claims, 8 Drawing Sheets

VEHICULAR UNDERCOVER AND METHOD OF MANUFACTURING THE SAME

CROSS REFERENCE TO RELATED APPLICATION

This application claims priority from Japanese Patent Application No. 2014-101101 filed May 15, 2014. The entire contents of the priority application are incorporated herein by reference.

FIELD OF THE INVENTION

The present disclosure relates to a vehicular undercover and a method of manufacturing the vehicular undercover.

BACKGROUND OF THE INVENTION

A vehicular undercover such as an engine undercover is manufactured by molding a sheet made of synthetic resin into a product shape.

Projections and recesses are continuously and alternately formed on two surfaces of a sheet member to improve rigidity of the sheet member. However, such a vehicular undercover having the projections and recesses does not keep flatness of a surface thereof, especially a vehicular exterior side surface. Therefore, air resistance during vehicle's moving may be increased and aerodynamic performance of a vehicle may be deteriorated.

An objective of the present technology is to provide a vehicular undercover that is formed by molding a sheet member made of synthetic resin and that maintains a flat surface thereof and high rigidity. Another objective of the present technology is to provide a method of manufacturing such a vehicular undercover.

SUMMARY OF THE INVENTION

To solve the above problems, a vehicular undercover constituting a lower surface of a vehicle and molded from a synthetic resin sheet includes a cover main body having a plate shape including one surface that is a flat surface and another surface that is opposite to the one surface, a reinforcing rib projecting from the other surface of the cover main body, and at least two auxiliary ribs projecting form the other surface of the cover main body and sandwiching the reinforcing rib therebetween. The cover main body includes a first portion that is between the at least two auxiliary ribs and has a first thickness, the cover main body includes a second portion that is on an opposite side to the first portion with respect to each of the at least two auxiliary ribs and has a second thickness, and the first thickness is smaller than the second thickness.

DETAILED DESCRIPTION OF EMBODIMENTS

An engine undercover 10 according to one embodiment will be described as a vehicular undercover with reference to FIGS. 1 to 8. The engine undercover 10 covers an engine (not illustrated) mounted in a vehicle from a lower side with respect to the vehicle. The engine undercover 10 is attached to a vehicular panel from a lower side with respect to the vehicle and constitutes a lower surface (a bottom portion) of the vehicle.

Figure 1:
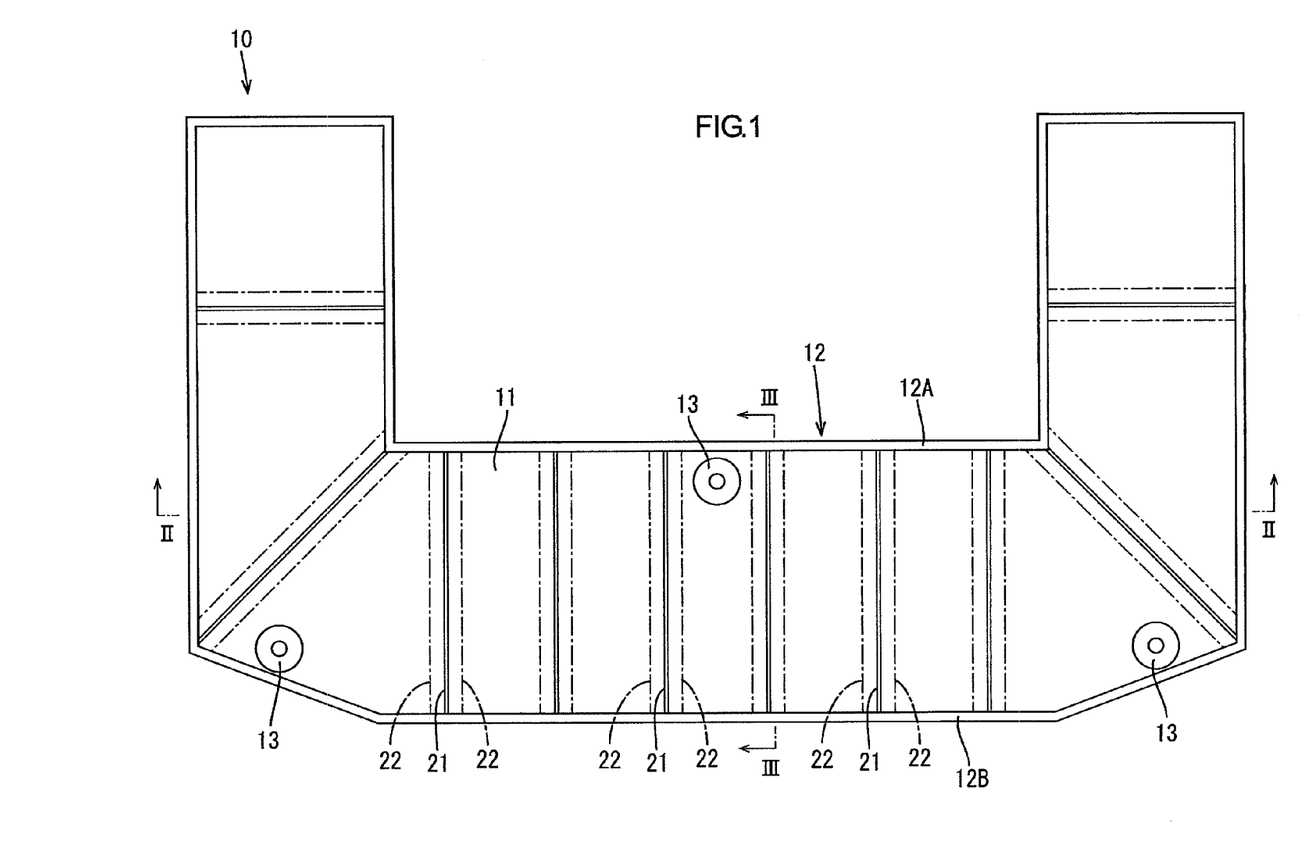
FIG. 1 is a plan view illustrating an engine undercover according to one embodiment of the present technology.
Figure 2:
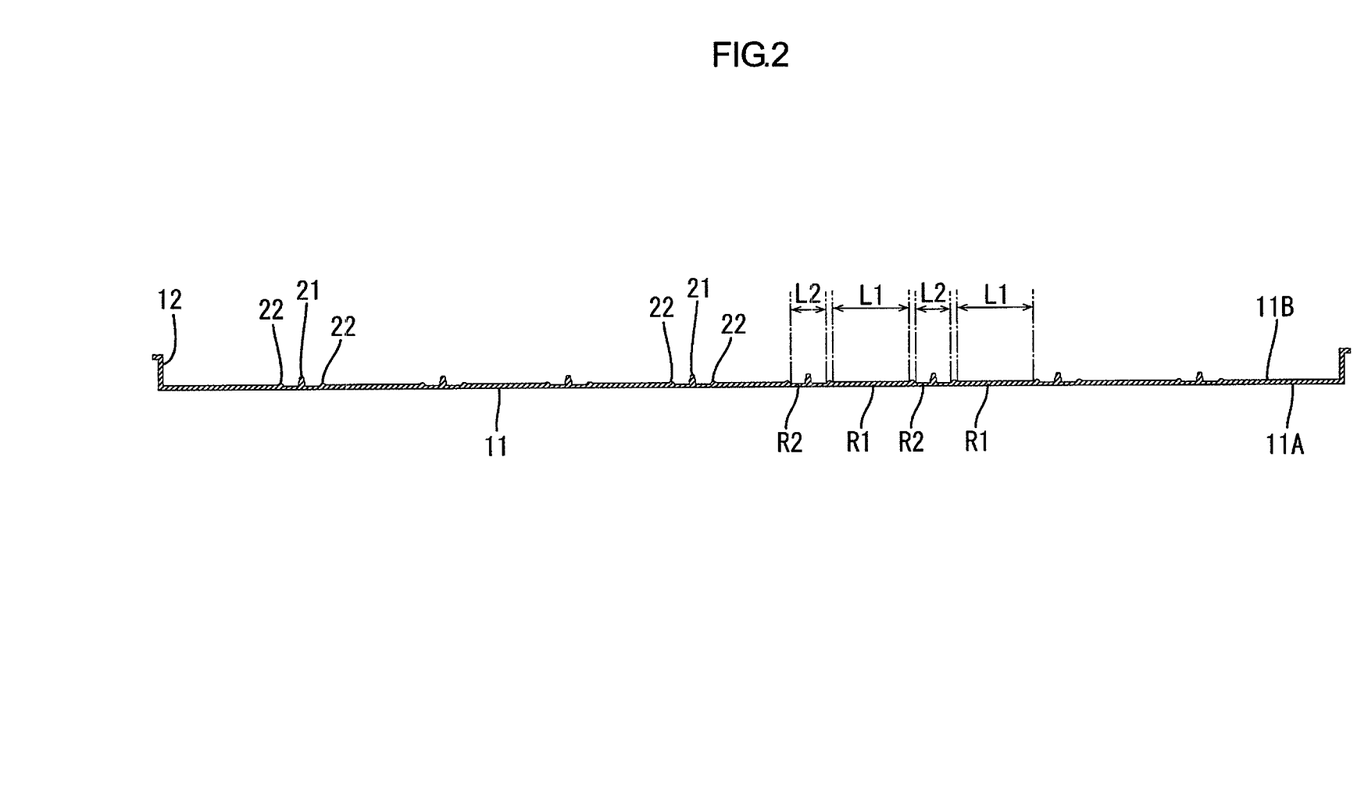
FIG. 2 is a cross-sectional view of the engine undercover taken along line II-II in FIG. 1.

As illustrated in FIGS. 1 and 2, the engine undercover 10 is obtained by molding a sheet member made of synthetic resin (for example, thermoplastic resin such as polyethylene). The engine undercover 10 includes a cover main body 11 having a plate-like shape and walls 12 that extend from peripheral edges of the cover main body 11. As illustrated in FIG. 1, the cover main body 11 has a substantially plan view U-shape. As illustrated in FIG. 2, the cover main body 11 has one surface 11A (a lower surface) that is a vehicular exterior surface and is a flat surface. The cover main body 11 does not necessarily have a substantially plan view U-shape but may be altered as appropriate. For example, the cover main body 11 may have a plan view square shape.

The cover main body 11 has another surface 11B that is opposite from the one surface 11A and is a vehicular interior surface. As illustrated in FIG. 1, the cover main body 11 includes reinforcing ribs 21 (first ribs) and auxiliary ribs 22 (second ribs) on the other surface 11B. Every pair of the auxiliary ribs 22 sandwiches each of the reinforcing ribs 21. The two auxiliary ribs 22 and the reinforcing rib 21 arranged between the two auxiliary ribs 22 constitute a set of ribs and sets of ribs including the reinforcing ribs 21 and auxiliary ribs 22 are arranged on the other surface 11B.

Each of the reinforcing ribs 21 has an elongated shape and extends along a short dimension in a corresponding portion of the cover main body 11. The auxiliary ribs 22 extend along the reinforcing rib 21. The reinforcing rib 21 has a shape such that a width thereof decreases as the reinforcing rib 21 projects from the other surface 11B toward a projected end thereof. Namely, the reinforcing rib 21 has a width smaller at a projected end than at a basal portion. The width of the reinforcing rib 21 may be constant along a projection length thereof. Namely, the reinforcing rib 21 may have a constant width from the basal portion to the projected end.

The auxiliary rib 22 has a shape such that a width thereof decreases as the auxiliary rib 22 projects from the other surface 11B toward a projected end thereof and has a round projected end surface. Namely, the auxiliary rib 22 has a width smaller at a projected end than at a basal portion. The auxiliary rib 22 does not necessarily have such a shape.

Figure 7:
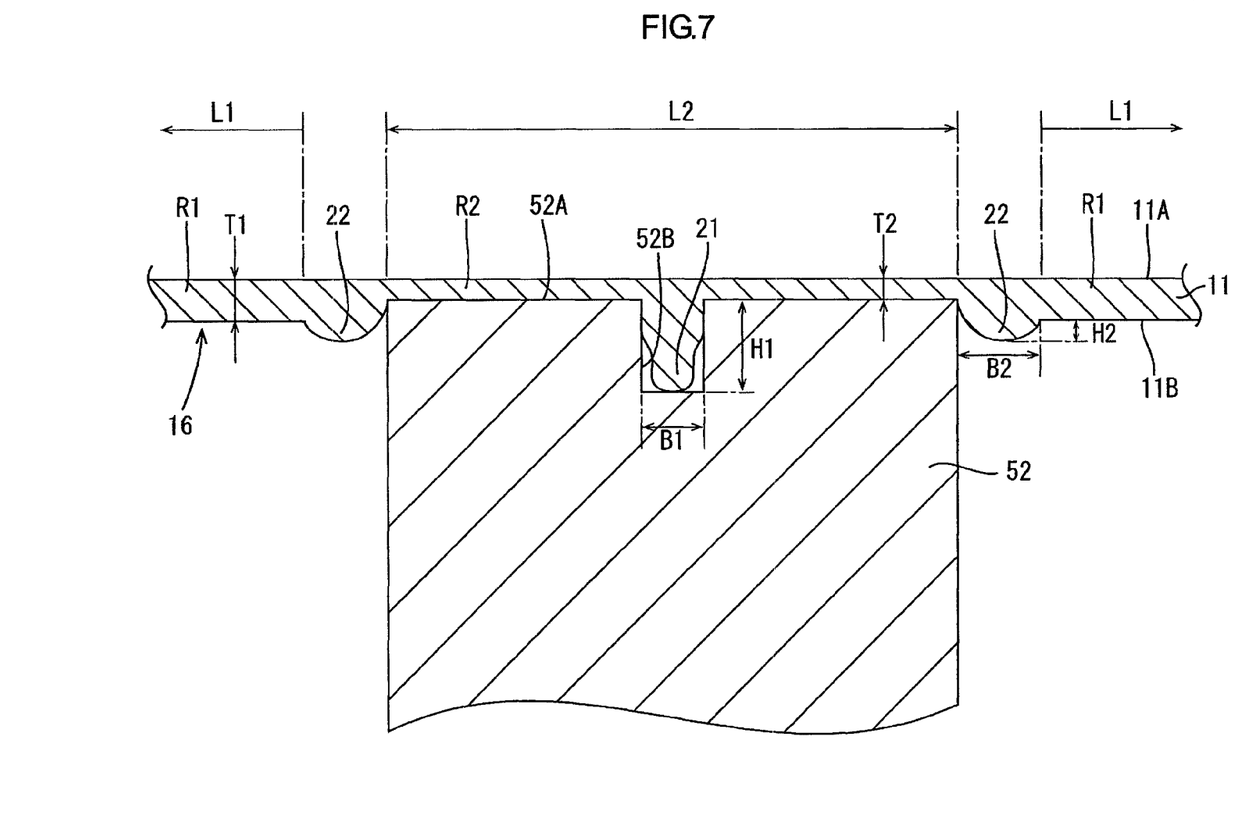
FIG. 7 is an enlarged cross-sectional view illustrating surroundings of a reinforcing rib in FIG. 5.

As illustrated in FIG. 7, the auxiliary rib 22 has a projection height H2 from the other surface 11B and the reinforcing rib 21 has a projection height H1 from the other surface 11B, and the projection height H2 is smaller than the projection height H1.

The basal portion of the auxiliary rib 22 has a width B2 greater than a width B1 of the basal portion of the reinforcing rib 21. The width B2 of the auxiliary rib 22 corresponds to a length thereof extending in a direction perpendicular to the elongated direction of the auxiliary rib 22. As illustrated in FIG. 7, the cover main body 11 includes a portion R2 that is between one set of the auxiliary ribs 22 and a portion R1 that is between the auxiliary rib 22 included in one set and the auxiliary rib 22 included in another set that is adjacent to the one set. The portion R2 has a thickness T2 smaller than a thickness T1 of the portion R1. As illustrated in FIG. 2, the portion R2 has a length L2 smaller than a length L1 of the portion R1.

Figure 3:
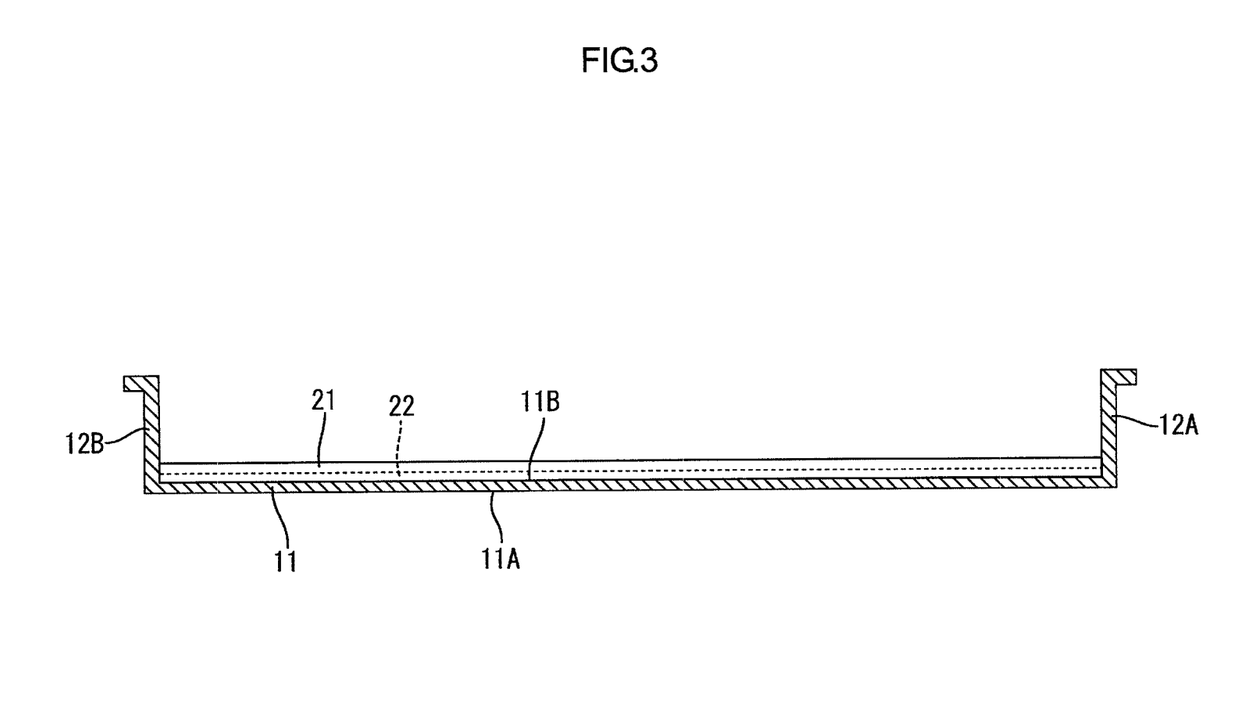
FIG. 3 is a cross-sectional view of the engine undercover taken along line III-III in FIG. 1.

As illustrated in FIGS. 1 and 3, the walls 12 includes walls 12A and 12B that are opposed to each other and the reinforcing ribs 21 and the auxiliary ribs 22 extend from the wall 12A to the wall 12B. Accordingly, the walls 12A and 12B have enhanced rigidity.

The cover main body 11 includes clip seats 13 on the other surface 11B and the clip seats 13 are projected from the other surface 11B. Clips (not illustrated) are mounted in the respective clip seats 13 so that the engine undercover 10 is attached to the vehicular panel.

Figure 4:
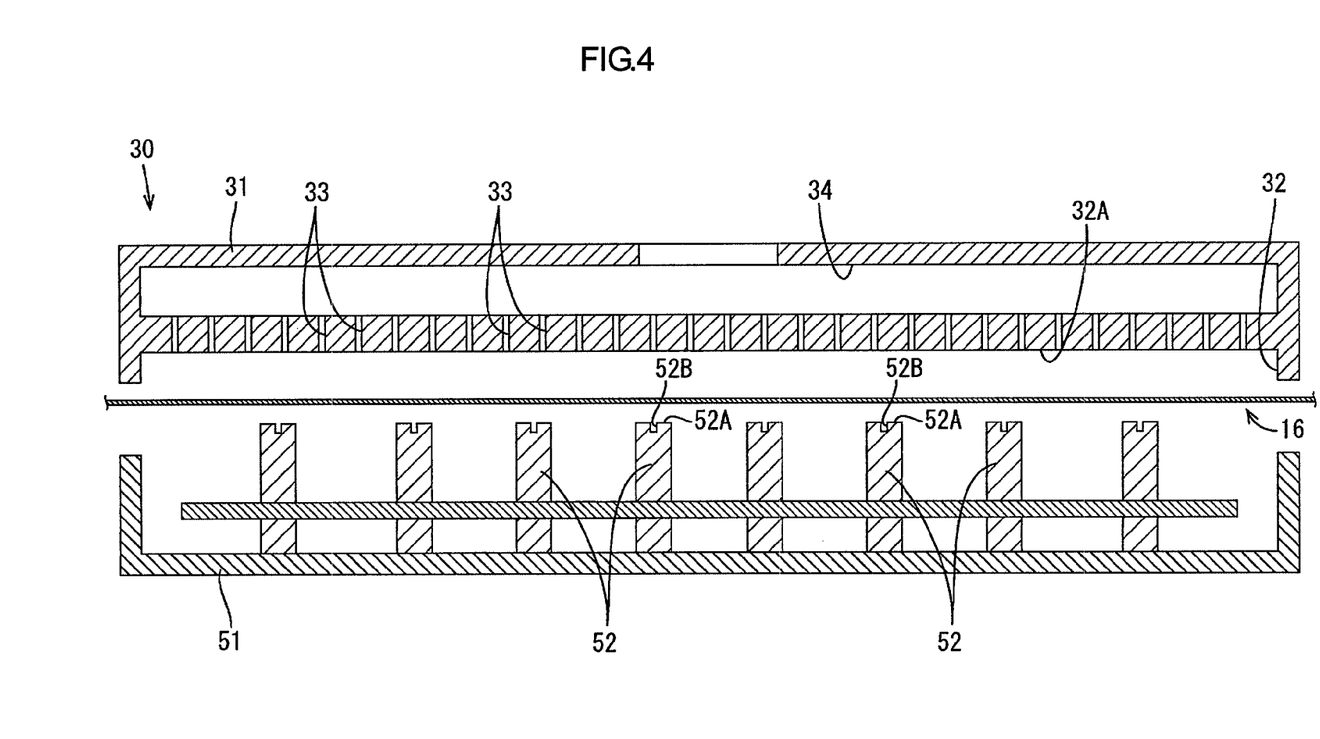
FIG. 4 is a cross-sectional view of a molding device that forms the engine undercover in FIG. 1.

Next, a molding device 30 for manufacturing the engine undercover 10 will be described. As illustrated in FIG. 4, the molding device 30 includes an upper die 31 (a first molding die) and a lower die 51 (a second molding die). The molding device 30 molds a sheet member 16 illustrated in FIG. 4 between the upper die 31 and the lower die 51 into the engine undercover 10.

The upper die 31 and the lower die 51 are moved to be relatively closer to and away from each other by a driving device such as an electric motor, an air cylinder, or a hydraulic cylinder (not illustrated). Thus, the upper die 31 and the lower die 51 are configured to be moved to open and close the molding dies. The molding device 30 is in a closed state (FIG. 5) when the upper die 31 and the lower die 51 are closed, and the molding device 30 is in an open state (FIG. 4) when the upper die 31 and the lower die 51 are open.

The upper die 31 has an opposed surface that is opposite the lower die 51 and has a molding recess 32 on the opposed surface. The molding recess 32 has a shape following the one surface 11A on the vehicular exterior side of the engine undercover 10. A recessed bottom of the molding recess 32 has suction through holes 33. Each of the suction through holes 33 is communicated with a vacuum chamber 34 that is inside the upper die 31 and the vacuum chamber 34 is connected to an air pressure control device such as a pump (not illustrated).

The sheet member 16 is placed between the upper die 31 and the lower die 51 and the air pressure control device is activated to apply negative pressure to the sheet member 16 through the suction through holes 33 (vacuuming). Accordingly, the sheet member 16 is suctioned to be closely adhered to an inner surface of the molding recess 32 and molded into a shape following an inner shape of the molding recess 32. A bottom surface 32A of the molding recess 32 is a flat surface and has a shape following the one surface 11A of the cover main body 11, that is, the vehicular exterior surface.

The lower die 51 has an opposed surface that is opposite the upper die 31 and includes pressing members 52 that project from the opposed surface toward the upper die 31. The pressing members 52 are used to form the reinforcing ribs 21 and auxiliary ribs 22 and have elongated block-like shape extending along the reinforcing ribs 21.

Each of the pressing members 52 has a pressing surface 52A that is opposed to the upper die 31 and the pressing members 52 press the sheet member 16 with the pressing surfaces 52A. The pressing members 52 have recesses 52B on the respective pressing surfaces 52A to form the reinforcing ribs 21. Each of the recesses 52B has a groove shape that follows the shape of the reinforcing rib 21.

Figure 5:
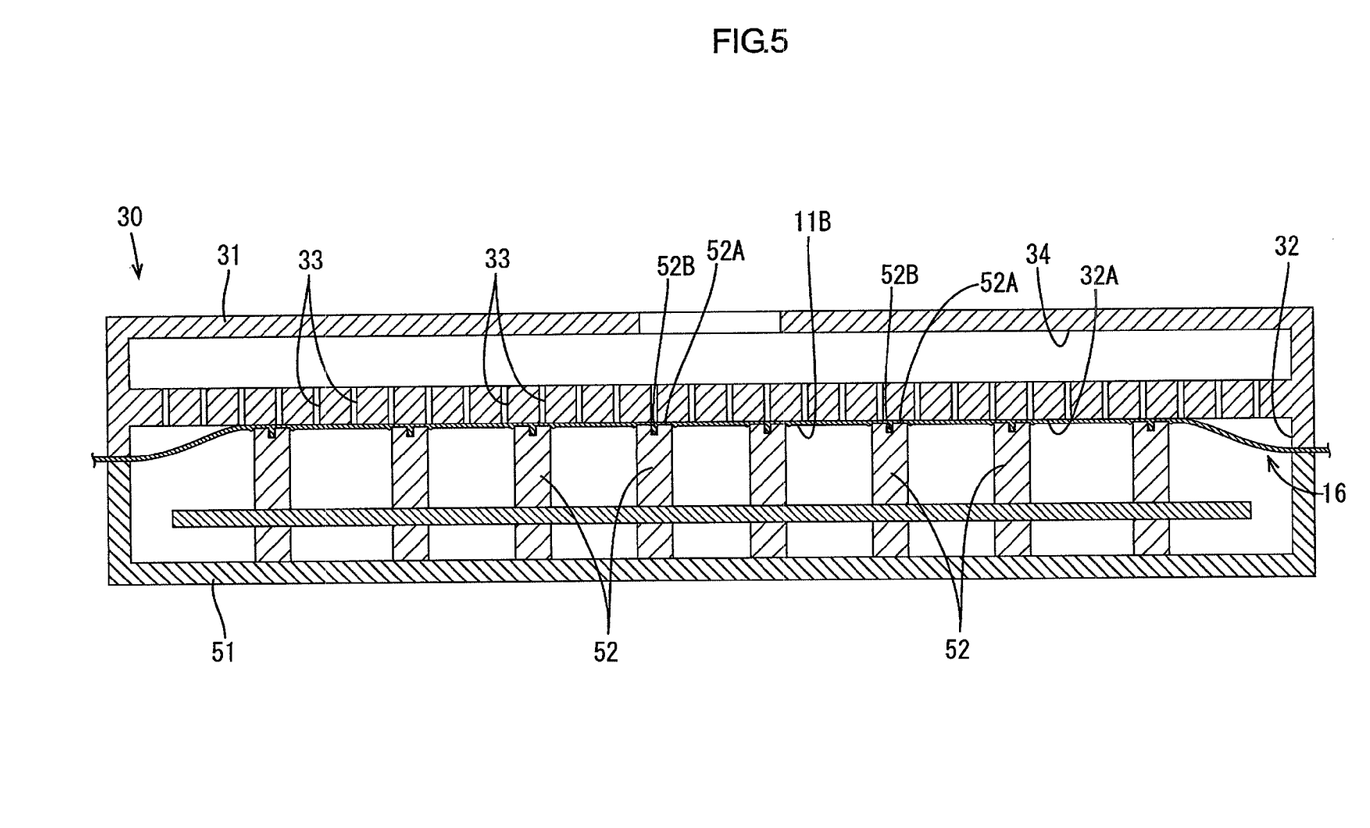
FIG. 5 is a cross-sectional view of the molding device in a rib forming process.
Figure 6:
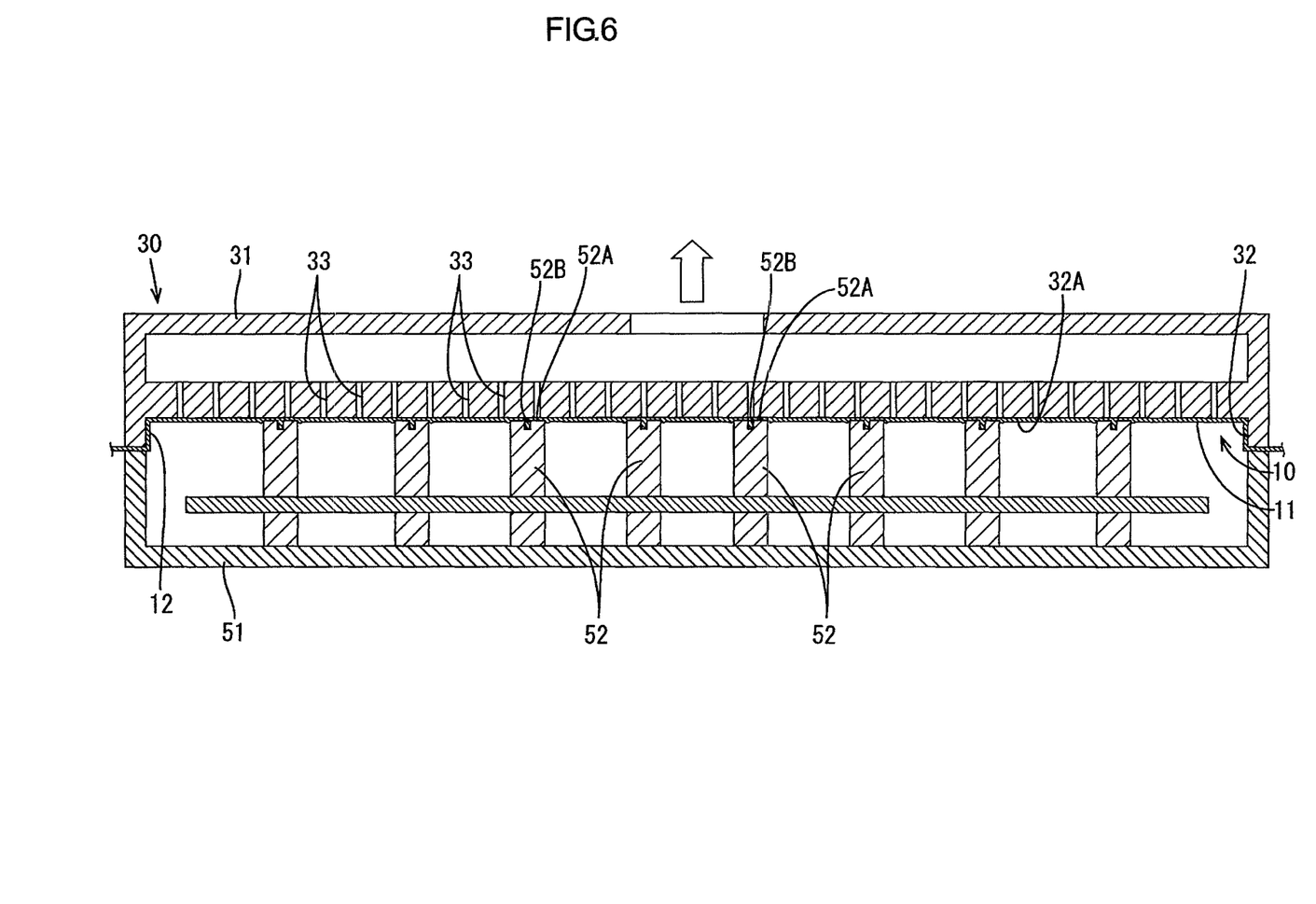
FIG. 6 is a cross-sectional view of the molding device in a vacuum molding process.

Next, a method of manufacturing the engine undercover 10 according to the present embodiment will be described. The method of manufacturing the engine undercover 10 according to the present embodiment includes a rib molding process and a vacuum molding process. In FIGS. 4 to 6, a part of the engine undercover 10 is illustrated. However, the upper die 31 and the lower die 51 having shapes corresponding to a shape of the whole engine undercover 10 are prepared to manufacture the engine undercover 10.

(Rib Molding Process)

As illustrated in FIG. 4, in the rib molding process, the sheet member 16 is placed between the upper die 31 and the lower die 51. The sheet member 16 is made of polyethylene that is an example of thermoplastic resin.

The sheet member 16 is made by an extruder (not illustrated). The extruder extrudes heated polyethylene into a sheet to obtain the sheet member 16. The sheet member 16 that is extruded by the extruder and placed between the upper die 31 and the lower die 51 is still heated and is softened.

After the sheet member 16 is placed between the upper die 31 and the lower die 51, the upper die 31 and the lower die 51 are closed. Accordingly, the pressing surfaces 52A are pressed against the other surface 11B of the sheet member 16. As illustrated in FIG. 7, the portions R2 of the sheet member 16 are pressed by the respective corresponding pressing surfaces 52A so that a part of softened thermoplastic resin of the sheet member 16 corresponding to the portion R2 enters an inner space of the recess 52B of each pressing surface 52A. Namely, in the portions R2 of the sheet member 16, the softened thermoplastic resin near the recesses 52B enters the recesses 52B. As a result, the thermoplastic resin in the recesses 52B form the reinforcing ribs 21. The upper die 31 is not illustrated in FIG. 7.

As illustrated in FIG. 7, the portions R2 of the sheet member 16 are pressed by the respective corresponding pressing surfaces 52A and another part of the softened thermoplastic resin of the sheet member 16 is pushed outwardly from each pressing surface 52A. The other part of the softened thermoplastic resin is different from the part that enters the inner space of the recess 52B. Namely, in the portions R2 of the sheet member 16, the softened thermoplastic resin near edge portions of the pressing surfaces 52A are pushed outwardly from the edge portions. Accordingly, the other part of the softened thermoplastic resin near the edge portions of the pressing surfaces 52A is pushed outwardly from the edge portions and the other part of the softened thermoplastic resin is raised along the edge portions of the pressing surfaces 52A to mold the auxiliary ribs 22. The portion R2 that is pressed by the pressing surface 52A has a thickness smaller than that of the portion R2 before the pressing. Namely, the thickness T2 of the portion R2 is smaller than the thickness T1 of the sheet member 16 before the pressing.

(Vacuum Molding Process)

After the rib molding process, in the vacuum molding process, the air pressure control device is activated to apply negative pressure to the pressed sheet member 16 through the suction through holes 33 with the upper die 31 and the lower die 51 being closed. Accordingly, as illustrated in FIG. 6, the heated sheet member 16 is suctioned and molded to have a shape following the shape of the molding recess 32 with vacuum molding. Namely, the one surface 11A (the vehicular exterior side surface) of the sheet member 16 becomes flat and the walls 12A, 12B are formed at the edges of the sheet member 16.

The sheet member 16 after the vacuum molding is cooled down by a cooling device (not illustrated) and then, transferred to a pressing die (not illustrated). The sheet member 16 is subjected to the trimming operation with the pressing die so as to correspond to an outer shape of the engine undercover 10. Accordingly, the engine undercover 10 is produced.

Next, advantageous effects of the present embodiment will be described. According to the engine undercover 10 of the present embodiment, the cover main body 11 includes the reinforcing ribs 21 and the auxiliary ribs 22 on the other surface (the vehicular interior side surface) 11B. Accordingly, the rigidity of the cover main body 11 is enhanced. The cover main body 11 has the one surface (the vehicular exterior side surface) 11A that is flat. Thus, the cover main body 11 has enhanced rigidity with having the one flat surface and the other surface having the ribs.

Figure 8:
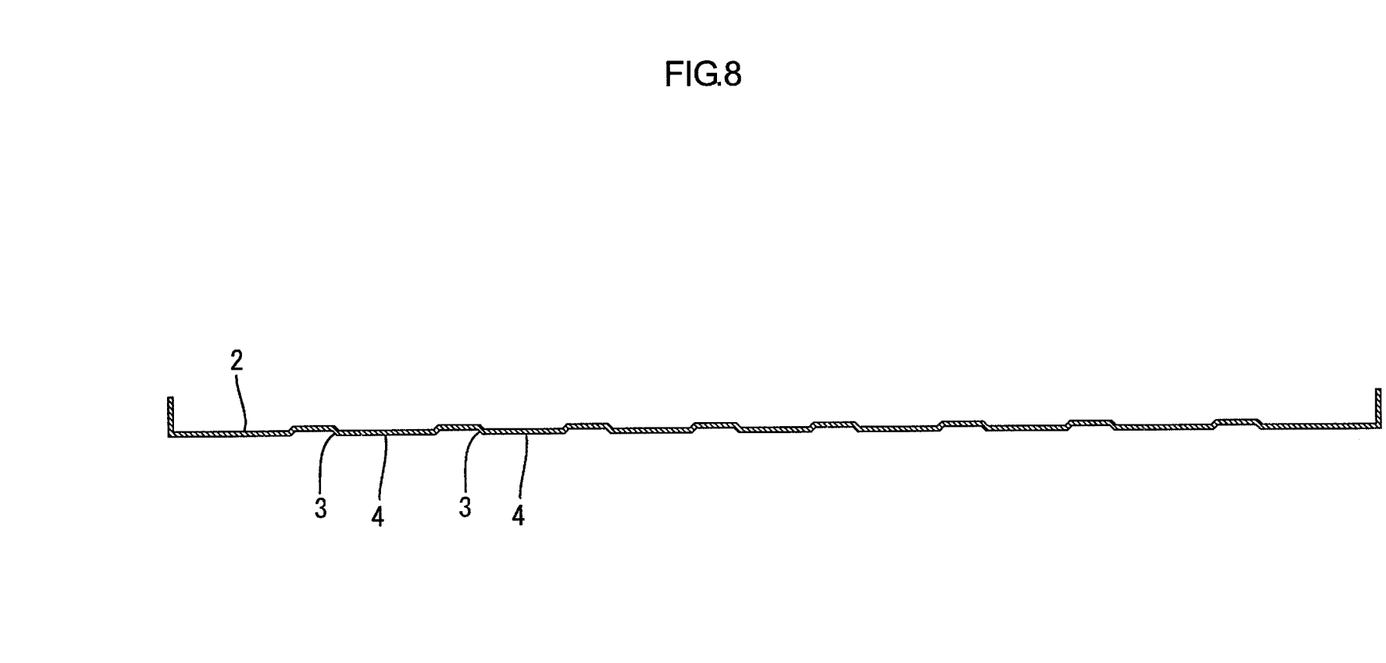
FIG. 8 is a cross-sectional view of an engine undercover according to a comparative example.

As illustrated in FIG. 8, if a cover main body 2 includes continuously recesses 3 and projections 4, namely, if the cover main body 2 includes recesses and projections on both surfaces thereof, a lower surface (a vehicular exterior side surface) of the cover main body 2 is not a flat surface. Therefore, the air resistance is increased while the vehicle is driving, and the vehicle aerodynamic performance may be deteriorated.

According to the present embodiment, the one surface of the cover main body 11 is flat and therefore, the aerodynamic performance is less likely to be deteriorated. Therefore, the engine undercover 10 made by molding a synthetic resin sheet member includes a surface (a vehicular exterior side surface) that is flat and the engine undercover 10 has enhanced rigidity.

The height H2 of each auxiliary rib 22 from the other surface 11B is smaller than the height H1 of each reinforcing rib 21 from the other surface 11B. In the rib molding process, the time or the pressing force of pressing the sheet member 16 with the upper die 31 and the lower die 51 may be controlled to obtain the above configuration, for example. According to such a configuration, the stability and rigidity of the auxiliary ribs 22 are further enhanced.

The width B2 of the auxiliary rib 22 is greater than the width B1 of the reinforcing rib 21. In the rib molding process, the time or the pressing force of pressing the sheet member 16 with the upper die 31 and the lower die 51 may be controlled to obtain the above configuration, for example. Accordingly, the rigidity of each of the auxiliary ribs 22 is enhanced and the portion R2 between a pair of the auxiliary ribs 22 has enhanced rigidity. According to the present embodiment, a part of the portion R2 of the sheet member 16 pressed by the pressing surface 52A constitutes the reinforcing rib 21. The height H1 of the reinforcing rib 21 is increased by decreasing the width B1 of the reinforcing rib 21.

According to the present embodiment, as illustrated in FIG. 7, the thickness T2 of the portion R2 between the pair of auxiliary ribs 22 is smaller than the thickness T1 of the portion R1 outside each auxiliary rib 22. Such a configuration is obtained by pressing the sheet member 16. Therefore, the portion R2 between the pair of auxiliary ribs 22 has a density higher than that of the portion R1 outside each auxiliary rib 22 and the rigidity of the portion R2 is enhanced. The portion R2 having the thickness T2 smaller than the thickness T1 of the portion R1 still maintains rigidity.

With the method of manufacturing the engine undercover 10 according to the present embodiment, the reinforcing ribs 21 are molded on the other surface 11B and therefore, the rigidity of the engine undercover 10 is enhanced. The rigidity of the engine undercover is enhanced by providing the ribs on the other surface 11B of the sheet member 16. With such a configuration, the one surface 11A (the vehicular exterior side surface) of the sheet member 16 is made to be flat. Accordingly, the engine undercover 10 has enhanced rigidity with maintaining a flat surface (on a vehicular exterior side surface).

In the rib molding process, the other part of the sheet member 16 near the edge portion of the pressing surface 52A is pushed by the pressing surface 52A outwardly from the edge portion so as to mold the pair of auxiliary ribs 22 on the other surface 11B (the vehicular interior side surface) sandwiching the reinforcing rib 21 therebetween.

According to the present embodiment, the reinforcing rib 21 and the pair of auxiliary ribs 22 sandwiching the reinforcing rib 21 therebetween are molded so that the rigidity of the cover main body is enhanced.

According to the present embodiment, the sheet member 16 is pressed by the pressing members 52 to mold the reinforcing ribs 21 and the auxiliary ribs 22. The sheet member 16 is sandwiched between the upper die 31 and the lower die 51 that are closed and pressed therebetween so that the reinforcing ribs 21 and the auxiliary ribs 22 are molded at the same time. Accordingly, the molding dies have more simple configurations compared to those used for injection molding.

If the auxiliary ribs are molded with injection molding, the auxiliary ribs are necessarily removed from the die. According to the present embodiment, a part of the sheet member 16 is pressed by the pressing member 52 to mold the auxiliary rib 22. Therefore, a special step of removing the molded auxiliary rib 22 from the die is not necessary and the pressing member 52 is easily separated from the sheet member 16.

According to the present embodiment, the sheet member 16 that is pressed by the pressing member 52 is subjected to the vacuum molding. Therefore, during the vacuum molding, the sheet member 16 is held by the pressing members 52.

Other Embodiments

The present technology is not limited to the description as described above with reference to the drawings. For example, the present technology may include following embodiments.

(1) In the above embodiment, the engine undercover 10 is used as the vehicular undercover. However, a floor undercover that covers a bottom portion of a vehicle may be used as the vehicular undercover.

(2) In the above embodiment, the vacuum molding process is carried out after the rib molding process. However, the rib molding process may be carried out after the vacuum molding process or the rib molding process and the vacuum molding process may be carried out simultaneously.

(3) The material of the sheet member 16 may not limited to be the ones described in the above embodiment and may be altered as appropriate. For example, the sheet member 16 may be made of a material obtained by impregnating fibers with thermoplastic resin (for example, polypropylene).

The invention claimed is:

1. A vehicular undercover constituting a lower surface of a vehicle and molded from a synthetic resin sheet, the vehicular undercover comprising:
   a cover main body having a plate shape including one surface that is a flat surface and another surface that is opposite to the one surface;
   a reinforcing rib projecting from the other surface of the cover main body; and
   at least two auxiliary ribs projecting from the other surface of the cover main body and sandwiching the reinforcing rib therebetween, wherein
   the cover main body, the reinforcing rib and the at least two auxiliary ribs are molded from the synthetic resin sheet to define an integrally molded unitary member where the cover main body, the reinforcing rib and the at least two auxiliary ribs are solid synthetic resin,
   the cover main body includes a first portion that is between the at least two auxiliary ribs which sandwich the reinforcing rib and has a first thickness,
   the cover main body further includes a second portion that is on an opposite side to the first portion with respect to each of the at least two auxiliary ribs and has a second thickness, and
   the first thickness is smaller than the second thickness.

2. The vehicular undercover according to claim 1, wherein
   the reinforcing rib projects from the other surface and has a first projection height,
   each of the at least two auxiliary ribs projects from the other surface and has a second projection height, and
   the first projection height is greater than the second projection height.

3. The vehicular undercover according to claim 1, wherein
   each of the at least two auxiliary ribs has a width greater than a width of the reinforcing rib.

4. The vehicular undercover according to claim 1, wherein
   the one surface is a vehicular exterior surface and the other surface is a vehicular interior surface.

5. The vehicular undercover according to claim 1, wherein
   the at least two auxiliary ribs and the reinforcing rib arranged between the at least two auxiliary ribs constitute a set of ribs, and
   the cover main body includes a plurality sets of ribs on the other surface.

6. The vehicular undercover according to claim 5, wherein
   the first portion is between the at least two auxiliary ribs included in each of the plurality sets of ribs, and
   the second portion is between one of the two auxiliary ribs included in one of the plurality sets of ribs and one of the two auxiliary ribs included in another one of the plurality sets of ribs, the other set of ribs is adjacent to the one set of ribs.

7. The vehicular undercover according to claim 6, wherein
   the first portion has a first length and the second portion has a second length, and
   the first length is smaller than the second length.

8. The vehicular undercover according to claim 1, wherein
   the cover main body has peripheral edges including at least two opposing edges, and
   the cover main body includes side walls extending from the at least two opposing edges, respectively.

9. The vehicular undercover according to claim 8, wherein
   the reinforcing rib and the at least two auxiliary ribs extend from one of the side walls to another one of the side walls.

10. The vehicular undercover according to claim 1, wherein
    a density of the first portion of the cover main body is greater than a density of the second portion of the cover main body.

* * * * *